Jan. 26, 1954   J. COLPO   2,667,364
TRACTOR-SEMITRAILER COUPLING DEVICE
Filed Feb. 23, 1952   2 Sheets-Sheet 1

INVENTOR.
JESSE COLPO
BY
Bean, Brooks, Buckley & Bean.
ATTORNEYS

Jan. 26, 1954          J. COLPO                2,667,364
             TRACTOR-SEMITRAILER COUPLING DEVICE
Filed Feb. 23, 1952                    2 Sheets-Sheet 2
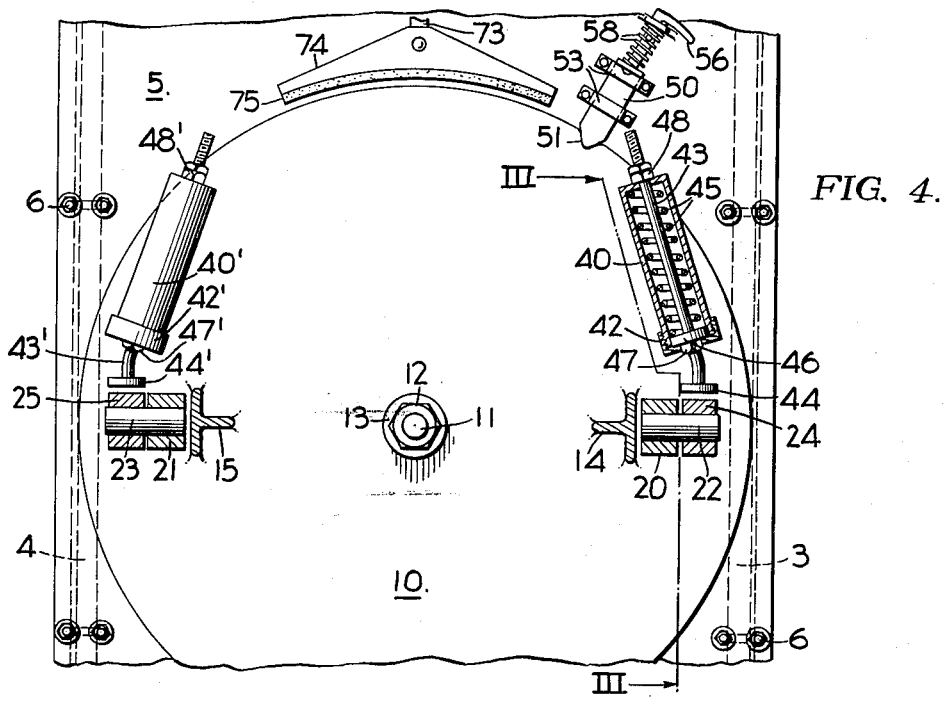
FIG. 4.
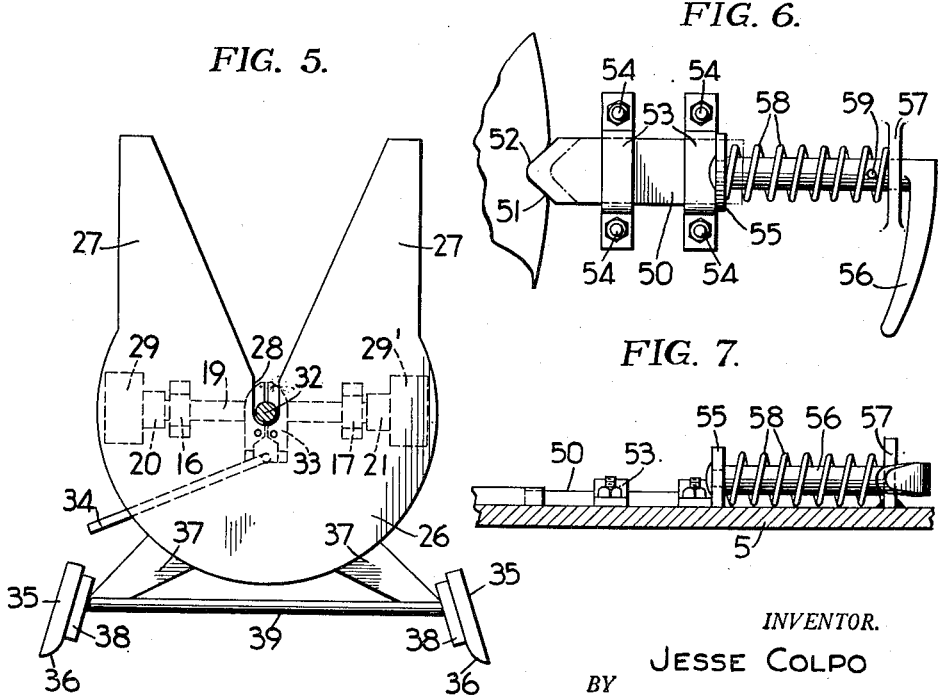
FIG. 5.
FIG. 6.
FIG. 7.
INVENTOR.
JESSE COLPO
BY
Bean, Brooks, Buckley & Bean
ATTORNEYS Patented Jan. 26, 1954

2,667,364

UNITED STATES PATENT OFFICE 2,667,364

TRACTOR-SEMITRAILER COUPLING DEVICE

Jesse Colpo, Orchard Park, N. Y.

Application February 23, 1952, Serial No. 273,069

16 Claims. (Cl. 280—432)

This invention relates generally to a connection device for supporting the forward end of a trailing vehicle such as a trailer or a semi-trailer on the rear end of a vehicle such as a tractor, and more specifically to such a connection device particularly adapted for use with heavy duty carriers of the type commonly known as freighters. This application is a continuation-in-part of applicant's copending application Ser. No. 250,656, filed October 10, 1951, and entitled Tractor Trailer Connection Device.

Many problems arise in providing suitable tractor-trailer connection devices. For example, if the connection device is such as to prevent any relative movement whatsoever between the tractor and the trailer lengthwise of the unit, sudden stops and starts impose a severe strain on the connection device. This is particularly dangerous if the trailer brakes do not function properly on a sudden stop, in which case the connection device may fail completely and permit the trailer to crash into the cab of the tractor. Another illustrative problem is the necessity for providing adequate transverse support for the trailer whereby to prevent tipping of the same. Other problems, too numerous to list here, are well known to those skilled in the art.

Accordingly, it is an object of this invention to provide a vehicle connection device arranged to permit limited and controlled relative lengthwise movement between the vehicle and the trailing vehicle.

Another object of this invention is to provide a tractor-trailer connection device incorporating an improved shock absorbing arrangement operative upon forward movement of the trailer relative to the tractor.

In addition, it is an object of this invention to provide a vehicle connection device arranged to provide full transverse support for the trailing vehicle at all times.

It is also an object of this invention to provide a vehicle connection device in the nature of a fifth wheel structure which can be used with conventional trailing vehicle structures without modification thereof.

A further object of this invention is the provision of a tractor-trailer connection device providing a support arrangement of improved stability.

Still another object of this invention resides in providing a tractor-trailer connection device incorporating cushioned stop means automatically preventing jackknifing of the tractor and trailer beyond approximately 94 degrees.

An additional object of the instant invention is to provide a vehicle connection device including means operable to hold or lock a tractor and a trailer in any predetermined relative angular position.

The aforesaid and other objects will become clearly apparent upon reading the following detailed description, taken together with the accompanying drawings wherein like reference numerals designate like parts throughout the various views and wherein:

Fig. 4 is a plan view, with certain parts in section, of the connection device of Fig. 2;

Fig. 5 is a plan view of the fifth wheel element of the connection device of the instant invention;

Fig. 6 is a plan view of a manually operable locking member utilized in the connection device of the instant invention; and Fig. 7 is a view in side elevation of the locking device of Fig. 6.

Figure 1:
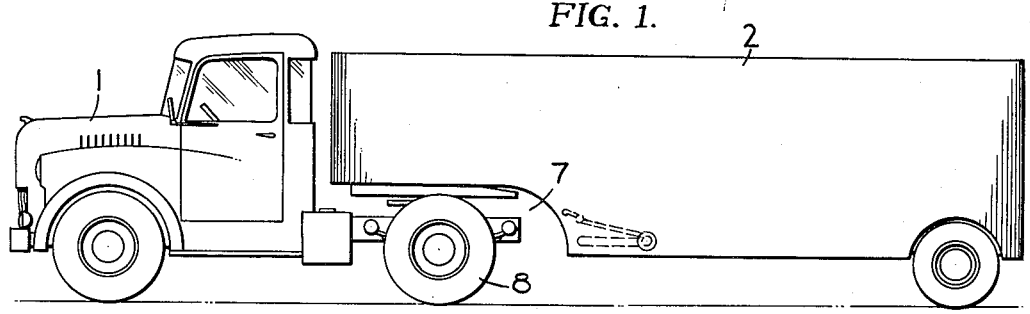
Fig. 1 is a view in side elevation of a tractor-trailer unit embodying the connection device of the instant invention.

There is shown in Fig. 1 of the drawings a tractor 1 and a trailer 2 coupled thereto by the connection device of the instant invention. Tractor 1 is provided at its rearward portion with side frame members 3 and 4, and a floor member 5 extends between and overlies said frame members and is secured thereto by means of U-bolts 6. The forward end of trailer 2 is recessed, as at 7, and said recess accommodates the rear wheels 8 of tractor 1 together with the connection device of the instant invention, the forward end of said trailer being connected to the rearward portion of the tractor in a manner to be described.

The connection device of the instant invention is seen to comprise a stabilizer or base plate 10 mounted on floor 5 for rotary movement relative thereto about a substantially upright or vertical axis, being secured to said floor by means of a bolt 11 together with a nut 12 and washer means 13. Of course, base plate 10 and floor 5 are appropriately lubricated to permit substantially friction-free relative movement therebetween.

Diametrically opposed spaced-apart bracket members 14 and 15 are formed on or secured to base plate 10, as by welding or the like, and have at their upper portions bearing members 16 and 17, respectively, each of said bearing members comprising two parts secured together as by means of bolts 18, or the like. A crankshaft 19 is removably journaled in bearings 16 and 17, and extends therebeyond at its opposite ends. Crank arms 20 and 21 are fixedly mounted on the outer ends of crankshaft 19 whereby to depend therefrom and move therewith, and said crank arms carry at their lower ends outwardly directed shafts 22 and 23, respectively. Support arm members 24 and 25, fixed to depend from a plate 26 comprising a fifth wheel structure, are pivotally connected at their lower ends to shafts 22 and 23, as clearly illustrated in Fig. 2, whereby support arms 24 and 25 and crank arms 20 and 21 together comprise a pair of articulated support members.

Figure 3:
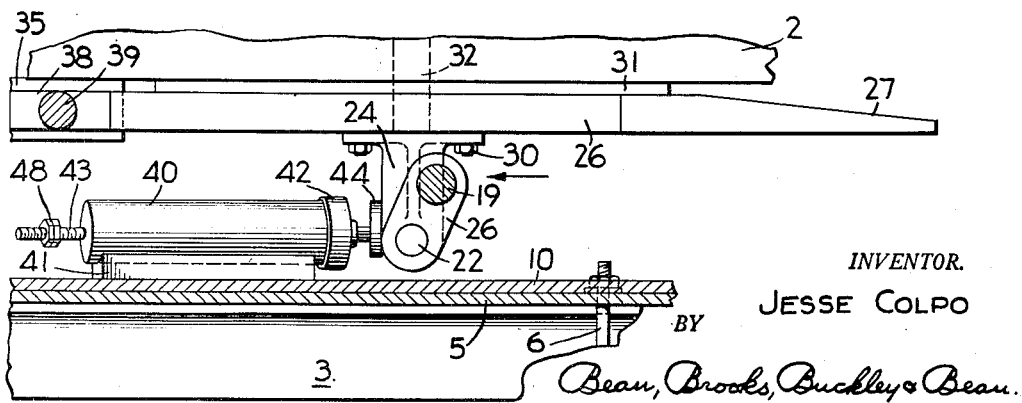
Fig. 3 is a view in side elevation of the connection device of Fig. 2 taken along line III—III of Fig. 4.

Fifth wheel plate 26 resembles in many respects a conventional construction of such members, comprising an approximately circular flat plate portion having rearwardly extending laterally spaced extensions 27 inclined downwardly as shown in Fig. 3, with the space therebetween forming a forwardly convergig V-like slot merging into a relatively narrow slot 28 at substantially the center of the circular portion of said plate, as illustrated in Fig. 5. The upper surface of each of support members 24 and 25 is shaped to form a flat face portion, as at 29 and 29', respectively, and said face portions are secured to the underside of plate 26 by any conventional means, as for example bolts 30, as clearly shown in Fig. 3. A plate member 31, having a substantially flat under surface, is rigidly secured to trailer 2 and a king pin 32 depends therefrom, whereby in coupling together the trailer and the tractor, king pin 32 is received in slot 28, and plate 31 is thus carried on plate 26. The downwardly inclined extensions 27 facilitate in a known manner the coupling of trailer 2 to tractor 1, permitting the forward end of trailer 2 to ride upwardly on said extensions and onto plate 26. King pin 32 is locked within slot 28 by a conventional locking arrangement carried by plate 26 and which may comprise, for example, pivoted jaw members 33 manually operable by means of a lever 34.

For reasons which will become clearly apparent, plate 26 is locked against movement relative to trailer 2, with all relative movement occurring between base plate 10 and floor 5 of tractor 1. Plate 26 is locked against movement relative to trailer 2 by an arrangement comprising spaced guide brackets 35 carried by trailer 2 to depend therefrom and each provided with a cam surface 36 on its forward inner surface. Plate 26 is provided with outwardly diverging arms 37 having ears 38 carried at their outer ends, and a brace member 39 extends therebetween. When the tractor-trailer unit is coupled together, ears 38 bear against brackets 35 and cooperate therewith and with king pin 32 to lock plate 26 against movement relative to trailer 2. Also, when coupling the tractor to the trailer, and in the event that plate 26 and extensions 27 are not properly alined with trailer 2 and king pin 32, ears 38 engage cam surfaces 36 of brackets 35 to aid in automatically alining said fifth wheel plate and said king pin.

Figure 2:
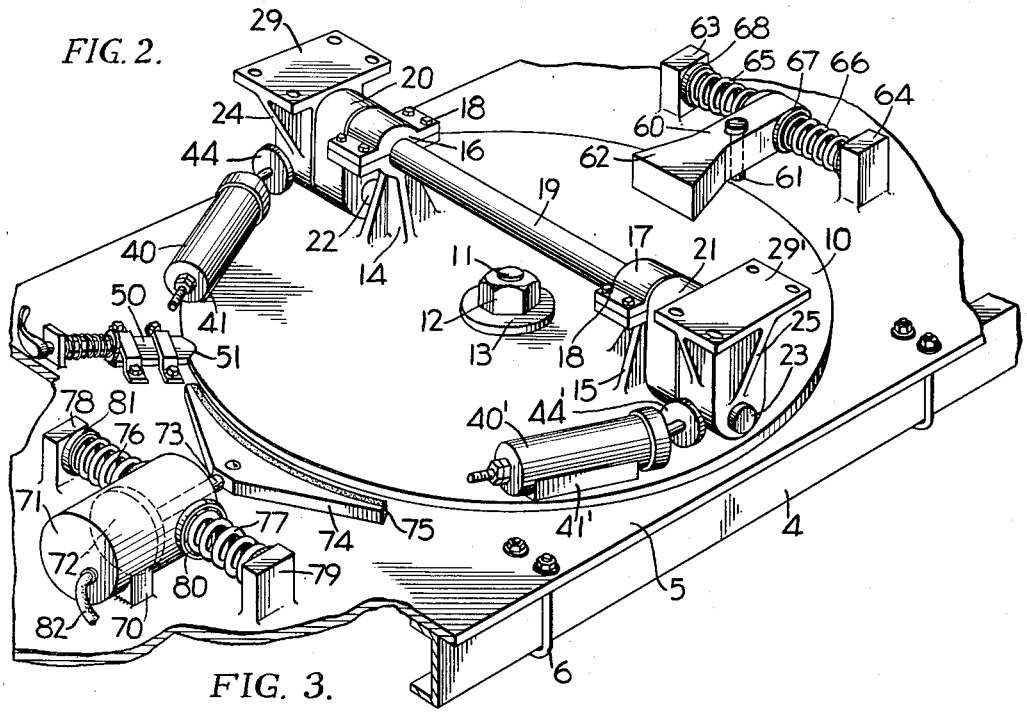
Fig. 2 is a fragmentary perspective view of the connection device of the instant invention.

It will be noted, from an inspection of Figs. 2 and 4, that base plate 10 is of a diameter approximately equaling the width of floor 5, and that brackets 14 and 15 are spaced apart a distance sufficient so that support members 24 and 25 are approximately located at opposed edge portions of base plate 10. In addition, plate 26 is locked to trailer 2 in a position such that crankshaft 19 extends, and support arms 24 and 25 are alined, transversely of trailer 2. Thus, since fifth wheel plate 26 is locked against movement relative to trailer 2, with relative movement for turning purposes occurring between plate 10 and floor 5, a maximum of transverse support is provided for trailer 2, and such support is provided at all times. Thus, even when tractor 1 and trailer 2 are jackknifed at right angles to each other, crankshaft 19 and the various support structures remain alined transversely of trailer 2, and thus there is provided for said trailer a maximum of transverse support even during extreme turning movements whereby to prevent any tipping motion of trailer 2.

Also, since crank arm 20 and support arm 24, and crank arm 21 and support arm 25, comprise in effect a pair of articulated support members, with support arms 24 and 25 each being eccentrically mounted on shaft 19 for oscillatory swinging movements relative thereto in a substantially vertical plane, limited and controlled relative lengthwise movement between tractor 1 and trailer 2 is permitted. Thus, upon sudden stopping of tractor 1, trailer 2 is permitted a limited forward movement relative to tractor 1, with support arms 24 and 25 and crank arms 20 and 21 swinging forwardly and upwardly about the substantially horizontal axis defined by crankshaft 19. This limited relative movement cushions the shock and strain which would result from sudden stops if a rigid connection device were utilized, and the weight of the trailing vehicle serves to aid in dampening and absorbing the forces causing support arms 24 and 25 to swing upwardly. Similarly, upon sudden starting, support arms 24 and 25 will tend to swing upwardly and rearwardly, and again the weight of trailer 2 will come into play thereby providing a shock absorbing effect.

Additional shock absorbing means are provided which means are operative upon forward movement of trailer 2 relative to tractor 1. Thus, as illustrated in Figs. 2, 3 and 4, there are provided two shock absorbing members located on the forward half of plate 10, said members comprising cylinders 40 and 40' carried by brackets 41 and 41' secured to base plate 10 as by welding or the like. Said cylinders are provided at one end with integral wall members, and at their opposite rearward end with removable cap members 42 and 42' threadedly secured thereon, and rod members 43 and 43' extend through cylinders 40 and 40', respectively, being bent at their rearward end portions into alinement with support arms 24 and 25, respectively. Shock pads 44 and 44', which pads may be made of either rubber or metal material, are carried by said rearward end portions of rods 43 and 43', respectively, and provide flat face portions adapted to abut support arms 24 and 25 upon forward swinging movement thereof, as illustrated in Fig. 3.

A compression spring, as illustrated at 45 in Fig. 4, extends between the forward end of cylinders 40 and 40' and a washer member carried by rods 43 and 43', as shown at 46, with the rearward movement of said washer members along said rods being limited by nut members 47 and 47'. Thus, upon forward swinging movements of support arms 24 and 25, said arms contact shock pads 44 and 44', as illustrated in Fig. 3, and compress said compression springs, which latter absorb the energy of such forward movement and thereby provide an effective shock absorbing arrangement. The pre-loading of said compression springs, as well as the distance of shock pads 44 and 44' from support arms 24 and 25, can be regulated by a lock nut arrangement 48 and 48' threadedly engaging the forward end of each of rods 43 and 43' and adapted to bear against the forward end wall of cylinders 40 and 40', respectively. Thus, the shock absorbing members can be adjusted by varying the position of lock nuts 48 and 48' on rods 43 and 43'.

Two important functions served by the shock absorbing members are as follows. Firstly, in the event that the trailer brakes, which normally are set to function a predetermined interval before the tractor brakes, do not operate properly, the strain imposed thereby on a rigid connection device upon a sudden stop might cause the connection to fail completely and permit the trailer to crash into the cab of the tractor. However, with the connection device of the instant invention permitting a limited degree of relative forward movement and providing the shock absorbing arrangement previously described, the shock absorbers receive the shock of sudden stopping and absorb the forces tending to drive the trailer toward and into the cab of the tractor. In addition, whereas without such shock absorbers there would be a tendency for the trailer to cam the fifth wheel plate 26 upwardly to a substantially vertical position during coupling movement, thus making it necessary to jam the tractor under the trailer producing severe strain on the connection device, by providing the shock absorbers disclosed herein such upward camming of the fifth wheel plate is effectively limited to a degree permitting easy coupling of the tractor to the trailer and avoiding any undue strain on the connection device.

In addition, whereas according to the instant invention means including bracket members 35 are provided for locking fifth wheel plate 26 against movement relative to trailer 2, with relative movement occurring between plate 10 and floor 5, the coupling device of the instant invention is adapted for use with conventional trailing vehicle structures adapted to receive a conventional fifth wheel element but not modified to provide bracket members corresponding to bracket members 35. Thus, when coupling to a trailer utilizing a king pin connection, a tractor provided with the instant coupling or connection device need only back under the trailer to cause fifth wheel plate 26 to receive the king pin in the manner heretofore described. However, in such case relative rotation between plate 26 and plate 31 would be permitted to occur. Thus, upon turning movements, rotation might occur between the connection device and the trailer, rather than between the connection device and the tractor, causing shaft 19 to be alined longitudinally of trailer 2, and, upon straightening out the tractor-trailer unit, it is possible that shaft 19 might remain alined longitudinally of trailer 2, thereby providing only a very limited degree of transverse support. Accordingly, to permit the connection device of the instant invention to be safely used with conventional trailer structures not modified to provide locking bracket means, means are provided for locking the connection device against movement relative to tractor 1, whereby although during turning movements shaft 19 will move out of transverse alinement with trailer 2, upon straightening out the unit full transverse support will once again be provided.

Such means are illustrated in Figs. 2, 6 and 7, and are seen to comprise a slidable locking bar 50 provided with a cam faced forward end 51 adapted to be received in a complementary shaped notch or recess 52 in the edge of plate 10, said locking bar and said recess being arranged so that upon engagement thereof plate 10 is locked against movement relative to floor 5 and with support brackets 14 and 15 and crankshaft 19 alined transversely of tractor 1. Thus, full transverse support will be provided as heretofore described whenever the tractor and trailer are in longitudinal alinement, and will be restored after each turning movement of tractor 1 relative to trailer 2. Locking bar 50 is slidable within spaced brackets 53 secured to floor 5 as by means of bolts 54 or the like, and is provided with an upstanding wall plate 55 adapted to bear against the outer bracket 53 to limit rearward movement of bar 50. A handle member 56 is connected to plate 55 and extends through a second plate 57 welded or otherwise secured to floor 5, and a compression spring 58 extends between plates 55 and 57. Thus, spring 58 normally biases locking bar 50 into engagement with recess 52, but upon pulling outwardly on handle member 56 said locking bar is disengaged from said recess. Handle member 56 is provided with a hole 59 extending therethrough, and when it is desired to retain bar 50 in unlocked position handle 56 is pulled outwardly and a pin, not illustrated, is dropped through hole 59 to bear against plate 57 and prevent handle 56 and consequently locking bar 50 from moving inwardly under the bias of spring 58. When it is desired to engage said locking bar with recess 52, it is only necessary to remove the aforesaid pin and permit spring 58 to cause such locking engagement.

Of course, this locking arrangement is used only when a tractor provided with a connection device of the instant invention is coupled to a trailer which is not provided with locking means preventing rotation of the fifth wheel plate relative to the trailer. Also, by reason of the cam shape of recess 52 and the forward end of locking bar 50, when said locking bar is released for engagement with said recess, if it is not properly alined therewith initially it will cam into engagement therewith under the influence of spring 58 upon proper alinement. At the same time, when said locking bar is engaged in said recess, if for any reason some binding action should occur preventing relative rotation between fifth wheel plate 26 and trailer 2, upon any attempted turning movement producing excessive strain on the connection device the force thus produced will overcome the bias of spring 58 and locking bar 50 will automatically cam out of engagement with recess 52, thereby permitting such turning movement. Thus, spring 58 is properly selected to overcome normal forces thereon but yield to excessive forces.

The instant invention also provides stop means preventing jackknifing of the tractor and trailer to more than approximately a 94° angle. If the tractor and trailer are turned at more than approximately 94° to each other, with many constructions the trailer will abut the cab of the tractor and thus damage the same. Such extreme jackknifing might occur upon loss of control over the tractor-trailer unit, and also during backing maneuvers when the operator is unable to see the position of the trailer with respect to the cab. For example, and particularly in the case of cabs providing a bunk at the rear of the cab behind the operator, in backing maneuvers the operator sometimes cannot see the position of the trailer relative to the cab when the same is turning to his right, and damage to the cab quite often results.

Such stop means are seen to comprise a stop member 60 pivoted to floor 5 of tractor 1 by a pivot pin 61, and having its inner end tapering outwardly as at 62. The outer end of stop member 60 extends transversely between two spaced brackets 63 and 64 carried on floor 5, and spring members 65 and 66 extend between stop member 60 and brackets 63 and 64, respectively. Said spring members are retained in position by retainers 67 on member 60 and retainers 68 on brackets 63 and 64, as illustrated, and may be connected to said brackets and said stop member in any known manner whereby to prevent accidental disassembly thereof. Said springs are of relatively short length, and are relatively strong, acting as shock absorbing means permitting an approximately 5° cushioned pivoting movement of member 60 in either direction. The sides of tapered end 62 are designed to abut support arms 24 and 25 after about an 89° turn in either direction.

The inner end 62 of stop member 60 intersects the path of movement of support arms 24 and 25, thus being operatively alined therewith whereupon during turning movements, and as base plate 10 rotates relative to floor 5, the support arm 24 or 25 thus caused to approach stop member 60 will abut the outer end 62 thereof upon approximately an 89° turn, and will move the same against the action of spring 65 or 66, whichever is the case, through a further 5° of cushioned shock absorbing movement until approximately a full 94° turn has been realized, at which time the appropriate spring 65 or 66 will have been so compressed that member 60 acts as a positive stop against further relative rotation between tractor 1 and trailer 2. Thus, even though the operator of the tractor cannot see the position of the trailer, stop member 60 acts to prevent relative turning or jackknifing beyond about a 94° angle, and thereby prevents damage to the trailer and the cab of the tractor which would otherwise result.

The connection device of the instant invention also provides means for holding or locking the vehicle and trailing vehicle in any desired relative angular position. To this end, there is mounted on a bracket 70, secured to floor 5 by welding or any other conventional means, a hollow cylinder 71 containing therein a piston member 72 and a piston rod 73 attached to said piston member and carrying at its outer end a brake shoe 74 having a curved surface conforming to the periphery of plate 10 and provided with an appropriate friction brake surface 75. Springs 76 and 77 extend between cylinder 71 and brackets 78 and 79, respectively, carried by floor 5, and serve as shock absorbing springs in much the same manner as springs 65 and 66, although pivotal movement of cylinder 71 is not intended and said springs serve more of a safeguard purpose. Said springs 76 and 77 may be connected to cylinder 71 and brackets 78 and 79 in any desired manner, and are retained in position by retaining members 80 carried by cylinder 71 and members 81 carried by brackets 78 and 79. A conduit 82 extends from cylinder 71, and said cylinder is arranged in a conventional manner to operate under fluid pressure, either by the application of pressure or a vacuum thereto through conduit 82, all in a known manner.

Thus, upon actuating cylinder 71 and piston 72 either automatically upon a predetermined turning movement or selectively at the will of the operator, brake shoe 74 will be caused to engage the rim of plate 10 and hold or lock the same against rotation relative to floor 5. If desired or necessary in any specific instance, the rim of plate 10 can be enlarged to provide an upstanding rim presenting a greater surface area for the braking action. The importance of this brake means is obvious since if, for example, the trailer should begin to jackknife upon the tractor in an undesirable manner, the operator can actuate piston 72 to apply brake shoe 74 to plate 10 and hold or lock the trailer against further jackknifing action, thus enabling the operator to prevent the serious and sometimes disastrous consequences which might otherwise occur.

Thus, it is seen that the instant invention fully accomplishes the aforesaid objects in providing an extremely stable tractor-trailer connection device giving full transverse support to the trailer at all times and even during turning movements of the tractor relative to the trailer. Additionally, this connection device can be used with conventional trailer structures and means are provided to insure proper operation in such use. Also, the instant connection device provides a shock absorbing arrangement operative upon forward movement of the trailer relative to the tractor, together with stop means limiting the degree of jackknifing possible between the tractor and the trailer and means for holding or locking the trailer to the tractor to prevent relative movement therebetween. While the instant invention has been disclosed in a preferred embodiment thereof, it is to be understood that the same is not necessarily limited to the various details of such embodiment, but can occupy other forms and modifications thereof without departing from the inventive concept. Accordingly, it is intended that this invention be defined and limited solely by the scope of the appended claims.

Having completely disclosed and fully described the instant invention in a preferred embodiment thereof, together with its mode of operation, what is claimed as new is as follows:

1. In combination with a tractor and a trailer, a connection device therefor comprising base plate means supported on said tractor for movement relative thereto about a substantially vertical axis, spaced upstanding support members carried by said base plate means, shaft means journaled in said support members, spaced support arms eccentrically pivoted to opposite ends of said shaft means for swinging movement thereabout in a substantially vertical plane, means connecting said support arms to said trailer, and resilient shock absorbing means in operative alinement with at least one of said support arms to limit and cushion the swinging movement thereof.

2. A connection device as set forth in claim 1, wherein said shock absorbing means includes a spring biased shock pad together with adjusting means regulating the spring bias and position of said shock pad from said support arm.

3. A connection device as set forth in claim 1, wherein said shock absorbing means comprises resilient shock absorbing members in operative alinement with each of said support arms and movable with said base plate means.

4. In combination, a vehicle, a trailing vehicle, and a connection device for coupling said trailing vehicle to said vehicle comprising, base plate means supported on said vehicle for movement relative thereto about a substantially upright axis, spaced upstanding support bracket means carried by said base plate means, shaft means journaled in said support bracket means to extend substantially horizontally therefrom, mounting plate means releasably connected to said trailing vehicle, spaced swinging articulated arm means extending between said mounting plate means and the opposite ends of said shaft means for supporting the former on the latter, and resilient shock absorbing means operatively alined with at least one of said articulated arm means to resiliently limit the swinging movement thereof in one direction.

5. A connection device as set forth in claim 4, including means locking said mounting plate means against movement relative to said trailing vehicle.

6. A connection device as set forth in claim 4, including locking means for holding said base plate means against movement relative to said vehicle.

7. A connection device as set forth in claim 6, wherein said locking means comprises a manually operable member selectively operable to engage recess means in said base plate means.

8. A connection device as set forth in claim 6, wherein said locking means comprises fluid actuated brake means operable to frictionally engage said base plate means.

9. In combination with a vehicle and a trailing vehicle, a connection device therefor comprising, base plate means mounted on said vehicle for movement relative thereto in a substantially horizontal plane, shaft support means carried by said base plate means, substantially horizontally extending shaft means carried by said support means, link means connected to said shaft means for swinging movements thereabout in a substantially vertical plane, means connecting said link means to said trailing vehicle, resilient shock absorbing means movable with said base plate means and operatively alined with said link means to resiliently limit the swinging movement thereof in at least one direction, and stop means operable upon predetermined movement of said base plate means relative to said vehicle to prevent further relative movement therebetween.

10. The combination set forth in claim 9, wherein said stop means comprises a spring-backed pivoted member operatively alined with means carried by said base plate means to resiliently resist further relative movement of said base plate means upon an approximately eighty-nine degree relative turning movement between said vehicle and said trailing vehicle in either direction and positively prevent such further movement upon an approximately ninety-four degree turning movement therebetween in either direction.

11. In combination with a vehicle and a trailing vehicle, a connection device extending therebetween and comprising base plate means supported on said vehicle for movement relative thereto about an axis, support bracket means carried by said base plate means, shaft means journaled in said bracket means, crank arm means carried by said shaft means, leg means releasably connecting said trailing vehicle to said crank arm means, and stop means carried by said vehicle and operatively alined with said leg means to prevent movement of said base plate means relative to said vehicle in either direction beyond a predetermined point.

12. The combination set forth in claim 11, wherein said stop means comprises a pivotally mounted member spring backed in either direction.

13. In combination with a vehicle and a trailing vehicle, a connection device therefor comprising a base structure carried by said vehicle and movable relative thereto about an upright axis, shaft support means carried by said base structure, shaft means journaled in said shaft support means to extend substantially horizontally therefrom, articulated arm means mounted on said shaft means for swinging movement thereabout and supporting said trailing vehicle on said shaft means, and resilient shock absorbing means in operative alinement with said articulated arm means to cushion and limit the swinging movement thereof.

14. A tractor-trailer connection device comprising, a floor member adapted to be mounted on a tractor, base plate means pivotally connected to said floor member for rotation relative thereto, substantially diametrically opposed support brackets carried by said base plate means, shaft means journaled in said support brackets to extend substantially parallel to the plane of said base plate means, mounting plate means adapted for connection to a trailer, spaced articulated arm means connecting said mounting plate means to said shaft means at spaced points thereon for swinging movement thereabout, and resilient shock absorbing means carried by said base plate means in alignment with at least one of said arm means to cushion and limit the swinging movement thereof in a forward direction.

15. A tractor-trailer connection device comprising, in combination with a tractor, base plate means pivotally supported on said tractor for movement relative thereto about a substantially upright axis, spaced support brackets carried by said base plate means, shaft means journaled in said support brackets, mounting plate means adapted for connection to a trailing vehicle carried by said shaft means, means defining a cam shaped recess in the periphery of said base plate means, a locking lever slidably mounted on said tractor, said lever having a cam shaped end portion engageable in said recess when aligned therewith and said spaced support brackets being aligned transversely of said tractor when said recess and said lever are aligned, spring means biasing said lever into engagement with said recess, said spring means being designed to permit said lever to cam out of said recess automatically upon a predetermined relative turning force on said base plate means, and manually operable means for retracting said lever.

16. A tractor-trailer connection device comprising, in combination with a tractor, base plate means pivotally connected to said tractor for rotation relative thereto, mounting plate means adapted for connection to a trailer, means supporting said mounting plate means on said base plate means for rocking movement relative thereto, and stop means limiting the relative turning movement in either direction between said base plate means and said tractor, said stop means comprising a first member carried by said base plate means for movement therewith, and a spring backed second member pivotally connected to said tractor and extending into the path of said first member to intercept the same upon a predetermined relative turning movement between said base plate means and said tractor in either direction to first yieldingly oppose and then positively prevent further relative turning movement therebetween.

JESSE COLPO.

References Cited in the file of this patent

UNITED STATES PATENTS

| Number | Name | Date |
|---|---|---|
| 2,100,463 | Wohlfarth | Nov. 30, 1937 |
| 2,130,004 | Fusetti | Sept. 13, 1938 |
| 2,441,293 | Seyferth | May 11, 1948 |
| 2,499,013 | Wood | Feb. 28, 1950 |
| 2,567,312 | Apgar | Sept. 11, 1951 |